United States Patent Office 2,926,114
Patented Feb. 23, 1960

2,926,114
MANUFACTURE OF CELLULOSIC PRODUCTS

Donald H. Grangaard and George H. Saunders, Appleton, Wis., assignors to Kimberly-Clark Corporation, Neenah, Wis., a corporation of Delaware No Drawing. Application August 12, 1957
Serial No. 677,750

7 Claims. (Cl. 162—16)

The present invention is concerned with a method for processing cellulosic raw materials for the simultaneous recovery of purified cellulose and by-products. More particularly, it is concerned with the pulping of wood and the simultaneous production of organic acids in readily recoverable form.

There are at present two commonly used methods of chemically pulping wood. These are the sulfite or acid process, and the alkaline process of which there are several different modifications. In the sulfite process, wood chips are introduced into a large digester vessel which may range in size from 8 to 17 feet in diameter and from 24 to 70 feet in height as shown by Table 5, chapter 4, Pulp and Paper Manufacture, volume 1, J. Newell Stevenson, editor in chief, 1st edition, McGraw-Hill Book Company, 1950. Acid sulfite liquor is then introduced into the digester and the chips cooked in this liquor for a period of from about eight to ten hours at temperatures ranging from approximately 130° to 150° C. under a pressure of 70 to 90 pounds per square inch gauge. In the Mitscherlich variation of the acid process, the cooking time may be as long as twenty hours but the temperature and pressure are usually lower.

Following the cooking period this pulp is separated from the waste liquor which is a tan to dark brown solution containing lignin in the form of a sulfonic acid, simple sugars resulting from the hydrolysis of cellulose and hemi-cellulose, and other waste materials. The waste liquor which usually contains about 50 percent of the initial substance of the wood is normally disposed of by dumping the waste liquor into streams. This disposal method is undesirable for several reasons. It involves a tremendous loss of potentially valuable raw materials, amounting, as is pointed out by Calkin on page 116, Modern Pulp and Paper Making, 3rd edition, Reinhold Publishing Company, to a substantial proportion of the 2,500,000 tons of spent liquor solids produced in the United States annually.

The dumping of sulfite waste liquor into streams also contributes to stream pollution. Part of the waste is in a form that readily takes up oxygen so that the waste liquor tends to remove available oxygen from the stream. In addition, the waste solids added to the stream may of themselves adversely effect the streams composition.

The alkaline processes for pulping wood are also usually carried out in large digesters which may range in size from 8 feet to 12 feet in diameter and 22 feet to 50 feet in height as shown by Table 14a, chapter 5, Pulp and Paper Manufacture, ibid. The chips are introduced into these digesters and are cooked in a solution of caustic soda, soda ash, sodium sulfide or sodium sulfate. Small amounts of sulfur may also be added to the liquor.

In the kraft alkaline process, cooks are normally carried out for a period of 2 to 6 hours at temperatures of 170° to 190° C. and at pressures which may rise as high as 160 pounds per square inch gauge. Upon completion of the cook the pulp is separated from the waste liquor and the waste liquor concentrated and burned to recover the chemicals used in pulping. The ligneous by-products, however, are not usually recovered, except in the form of heat.

Various efforts have been made to recover useful products from the ligneous and other wastes of these pulping processes. Most of these recovery efforts have been based upon the physical properties of the waste liquor. For example, there has been some use of the waste for soil modifiers, adhesives, emulsifying agents, roadbinders, tanning agents and the like. There have also been processes to obtain chemical products such as vanillin, yeast, alcohol and improved tanning agents from waste liquors. The chemical processing has been relatively difficult, however, and the total recovery of useful products by all methods has been very small.

Pulping methods employing other pulping agents have also been tried in an effort to obtain improved pulping and, or in the alternative, to avoid the difficulties inherent in the prior processes. For example, oxygen has been tried as the pulping agent in pulping processes at both low and high pressures. However, these oxygen pulping processes have been relatively unsuccessful. Inadequate pulping was obtained at low pressures in the method described and the oxygen treatment was therefore used only as a single stage in a multiple stage pulping process employing more conventional pulping chemicals to complete the pulping. In the high pressure processes, oxygen was employed as the pulping agent but the pressures were so high that the large volume batch digesters which are used to make pulping economically feasible cannot be readily constructed to sustain the extremely high pressures used in these processes.

The present invention is concerned with pulping processes involving the use of oxygen as the pulping agent. The invention is based on certain discoveries which make possible successful pulping with oxygen at practical pressures and temperatures.

It is an object of the present invention to provide an improved single stage pulping method employing gaseous oxygen. It is an additional object of the present invention to provide a pulping process whereby purified pulp and organic acids in readily recoverable form are produced. A further object is to provide a pulping process, wherein the waste disposal problem is minimized Other objects of the present invention will be apparent from the detailed description which follows.

Specifically, we have discovered that wood can be converted into pulp and freed from lignin in a single operation while the lignin initially present in the wood is simultaneously converted into organic acids of considerable commercial importance. The process of the present invention comprises digesting wood chips suspended in an aqueous solution maintained at a pH in the range of about 7 to 9 at temperatures of the order of 120° to 160° C. and preferably 130° to 150° C. for periods of time of the order of about 1 to 10 hours while using as the active cooking agent oxygen maintained in the dissolved state in the aqueous solution. The suspension is maintained in contact with an oxygen containing atmosphere, having a partial pressure of oxygen of at least about 40 pounds per square inch and preferably between about 40 and 250 pounds per square inch during the cooking operation. This oxygen pulping method not only produces a substantial yield of relatively pure cellulose pulp but also oxidizes a substantial proportion of the lignin present to various organic acids such as formic, acetic, fumaric, succinic and pyromellitic, which are readily recovered from the cooking liquid in accordance with the methods described in the present specification.

It has been found that the present process can be carried out under the above conditions of temperature, time and oxygen partial pressures in commercial digesters of the types and sizes now used in batch sulfite and alkaline processes if adequate mass transfer of the gaseous oxygen to the pulping solution is maintained. Commercial digesters of the types described in Tables 5 and 14a of chapter 5 of Pulp and Paper Manufacture ibid. normally have a height to diameter ratio of from about 2 to 6. If these digesters are nearly filled with the wood chip-solution mixture leaving only a relatively small gas space, for example 5 to 10 percent of the total volume of the digester above the solution level in the digester, these digesters will have a ratio of a continuous gas-liquid interfacial area in square feet to solution volume in cubic feet of about 0.02 to 0.10.

We have determined that this ratio of a gas-liquid interfacial area to the solution volume is of great importance to the successful pulping of wood and like cellulosic materials by the use of oxygen. In general, this ratio must be greater than about 1.0.

The term "solution volume" is used throughout the present specification and claims to include the total volume occupied by the cooking liquor and solids suspended therein both within the digester and in any re-entrant side stream.

The ratio of total gas-liquid interfacial area to solution volume can be increased in several ways. One method comprises the passing of oxygen gas through the solution during pulping. The oxygen may be introduced at or near the bottom of the digester vessel during the pulping operation so that it bubbles through the liquid-chip suspension phase throughout the pulping operation. This establishes a discontinuous gas-liquid interfacial area which greatly increases the total gas-liquid interfacial area to solution volume ratio. Fresh oxygen from an oxygen producing unit may be pumped through the cooking solution or oxygen from the gas space in the digester above the solution may be pumped through the solution or a combination of the two methods may be used. Modern methods of preventing channeling should also be provided. These may include distributor nozzles and/or agitation of the cooking solution by known methods.

The solubility of the oxygen in the cooking liquid is, in general, not appreciably affected by the presence of other indifferent gases in the system. Therefore, not only pure oxygen can be used as a pulping agent but any oxygen containing gas in which the diluent gas or gases are inert, for example air, can be used in the gas transfer apparatus or digester. However, the minimum partial pressure of the oxygen must be maintained within the limits specified in the present specification. It is, therefore, desirable to use a relatively concentrated oxygen atmosphere since the total pressure can thus be maintained at the lowest possibe figure. During the pulping operation inert gases may be removed from the gas space in the digester in order to maintain the total pressure in the digester at a minimum.

The term "continuous gas-liquid interface" is used throughout the present specification and claims to describe the surface of the main body of the cooking liquid which is in continuous contact with the oxygen atmosphere in the top of the digester vessel. The term "discontinuous gas-liquid interface" refers to all other surfaces of the digester liquid which are exposed to an oxygen atmosphere, for example the digester liquid surface exposed to bubbles which are passed through the main body of cooking liquid in the digester or the surface of a side stream of liquid from the digester which is exposed to a gaseous atmosphere in a vapor-liquid transfer apparatus separate from the digester. The term "side stream" refers to the stream of cooking liquid which is removed from the main body of the cooking liquid and then returned to the main body of cooking liquid after passing through a gas transfer apparatus of some variety. The term "total interfacial area" refers to the sum of the continuous and discontinuous interfacial areas.

The preferred method of obtaining an adequate transfer of oxygen from the gas phase to the solution is by circulation of a portion of the solution as a side stream in contact with gaseous oxygen in such a manner that the interfacial area of the side stream in contact with the gaseous oxygen is very large in proportion to the volume of the side stream. In this manner the total interfacial area to solution volume ratio is increased to a value of at least one. This may be done by removing a portion of the digester solution as a side stream and returning the side stream to the solution by passing it in a finely divided state through the oxygen atmosphere in the top of the digester above the cooking solution. For example, the side stream may be returned to the main body of the liquid through a spray nozzle or a perforated cone in the top of the digester. This will result in a discontinuous gas-liquid interfacial area wherein the surface area to volume ratio will be very large. A greatly improved transfer of oxygen to the cooking solution results therefrom.

Alternatively, a side stream of the digester liquid may be circulated through an exterior gas-liquid contactor wherein the liquid is passed in contact with the oxygen with a large ratio of interfacial area to liquid volume. Conventional vapor-liquid transfer apparatus such as spray towers, wetted wall columns, perforated plate towers, bubble cap plate towers, sieve plate towers, packed towers, turbo mixers, and other types of vapor-liquid apparatus, such as are described in chapters 23–26, 35, and 36, Unit Operations, G. G. Brown, 1950 edition, John Wiley & Sons, may be used. All such methods of vapor-liquid transfer are based at least in part upon obtaining a ratio of gas-liquid interfacial area to liquid volume substantially greater than two and this ratio is normally many times greater than the ratio of gas-liquid continuous interfacial area to liquid volume in a conventional digester. The partial pressure of the oxygen in the vapor-liquid transfer apparatus is normally maintained at the same partial pressure as the oxygen in the digester. The side stream which is returned to the digester from the vapor-liquid transfer contactor may be introduced into the digester in the gas space above the solution or beneath the surface of the solution.

The volume of cooking solution passed through the oxygen-solution contactor may depend upon several factors including the efficiency of the contactor, the gas pressure in the digester and the time and temperature of the cook. The amount of solution required to pass through the particular vapor-liquid transfer apparatus under the desired conditions of temperature, pressure and cooking time, in order to achieve the desired ratio of total interfacial area to solution volume can be determined by routine experimentation for the particular condition of the digester time, temperature, etc. It may vary, for example, from ½ gallon per minute per cubic foot of solution volume with efficient vapor contactors to one or more g.p.m. per cubic foot of solution volume with less efficient vapor-liquid transfer apparatus. The total interfacial area to solution volume ratio should be substantially greater than the ratio of continuous area to solution volume and the total interfacial area to solution volume ratio must be at least about one or greater. As large an interfacial area as desired may be used, but there is no advantage in expanding the area beyond that which will result in substantial saturation of the solution with oxygen.

Some of the more modern digesters are capable of withstanding pressures of 150 to 160 pounds per square inch. The process of the present invention can be carried out in such batch digesters, therefore, by the addition of suitable gas transfer apparatus without other modification of the digester. It is preferable to carry out the present process at a digester pressure of approximately 100 to 200 pounds per square inch gauge and an oxygen partial pressure of approximately 46 to 186 pounds per square inch. Batch digesters of the sizes presently used can be easily constructed to withstand this pressure. In addition to the present process adaptability to use in batch digesters of the size currently being used, it can also be used in the continuous processing of wood chips. A smaller size digesting vessel and a higher total pressure would be desirable for use of the present process in a continuous digestion method. Continuous digesters which are now in use with conventional methods are capable of withstanding pressures of the order of 300 pounds per square inch and these continuous digesters, therefore, could be used with the process of the present invention without modification.

The process of the present invention is generally applicable to the pulping of wood. The pulping operation is usually carried out with wood chips, that is, small bits of wood from ¼ to ⅞ inch in length. Wood shaves and other fragments of wood, which have retained their fibrous nature, may also be used. Other ligneous containing cellulosic raw materials such as flax, bagasse, esparto, straw, hemp, etc., may also be pulped by the present method.

The wood to water ratio in the cooking solution may vary considerably. A sufficient amount of water should be used in the digester to substantially wet all of the ligneous raw material used in the particular cook. Any large excess of water over that required to wet the chips, however, requires a larger reaction vessel without any improved results being obtained thereby. The ratio of water to wood is, therefore, preferably maintained between about 5 to 1 and 20 to 1.

The hydrogen ion concentration must be maintained within a pH range of about 7 to 9 during the major portion of the cooking time. This may be accomplished by the use of a buffer in the solution such as sodium bicarbonate which can be added at the start of the cook and will maintain a pH within the correct range throughout the entire period of the cook. The pH may also be maintained within the correct range by the continuous addition throughout the cooking period of an alkaline material such as sodium hydroxide, soda ash, etc., in quantities sufficient to neutralize the free acids formed throughout the period. The end pH may be slightly higher than 9, for example 9.4, provided the pH is maintained within the approximately 7–9 limit during the majority of the cooking time.

The digestion should be carried out between temperatures of approximately 120° and 160° C. and preferably between 130° and 150° C. At temperatures greater than about 160° cellulose pulp tends to be degraded whereas at temperatures below 120° an excessive reaction time is required. The reaction time may vary from approximately one hour at the higher temperatures to as long as approximately ten hours at lower temperatures. As will be evident from the examples, an excellent yield of pulp may be obtained by cooking at 140° C. for six hours.

Upon completion of the digestion period the pulp may be blown from the digester in the conventional manner and separated from the cooking liquor. The spent cooking liquid from the present process is characteristically different from the spent cooking liquid of the existing acid and alkaline pulping processes. Instead of being brownish liquid containing considerable quantities of dissolved matter, the spent liquor obtained by the present process is a light straw to light brown colored liquid having a viscosity which is very substantially less than that of the conventional spent cooking liquors.

In order to recover the organic acids the liquor may be concentrated by evaporation if desired but this is not a necessary step. The liquor may be acidified with a strong acid such sulfuric to a pH of about two whereupon a slight precipitate may form. The amount of precipitate at this stage is dependent upon the conditions under which the pulping reaction has been carried out. The precipitate will be less at higher pressures and/or temperatures than when lower pressures and/or temperatures are used. The precipitate is separated by conventional methods of separating solids from liquids. Extraction of the solution with an organic solvent such as ether, produces an organic solvent extract rich in organic acids. The ether extract on distillation to a ratio of distillate to residue of about 2 or 2.5 to 1 produces a distillate consisting of a mixture of formic and acetic acids and a residue which is a mixture of higher acids such as fumaric, succinic and pyromelletic. These latter acids can be recovered by the conventional methods of fractional distillation, solvent extraction or recrystallization from the fractions. Extraction of the ether extract raffinate with butanol produces a butanol extract rich in the n-butanol esters of various organic acids. The original precipitate obtained upon acidification of the digester liquor and the raffinate from the original ether extraction may also be treated in accordance with the method described in the copending United States application Serial No. 677,792, filed August 12, 1957, to obtain other additional useful by-products. The spent cooking liquor may also be treated by other methods to recover useful by-products.

The production of particular acids can be optimized by various modifications in the present process. A portion of the cooking liquid may be removed from the digester either continuously throughout the cooking process or at predetermined intervals and this portion processed for the recovery of the organic acids in accordance with the method described in the above mentioned copending application. The portion of the digester liquid removed in this manner would be replaced in the digester with freshly oxygenated cooking solution. Thus, the higher molecular weight acids produced in the cooking liquor would not be exposed to the oxidizing conditions through the cooking period and the production of lower molecular weight organic acids would be minimized. Furthermore, the maximum oxygen content of the cooking liquid would be applied to the pulping operation since less of the dissolved oxygen would be used in oxidizing the by-products from the non-cellulosic components. This modification of the present invention would be particularly adaptable to the continuous processing of ligneous raw materials since the oxygenated cooking liquid could be continuously passed through the digester and then to the acid recovery step. Other modifications will be readily apparent to those skilled in the art.

Substantially all of the noncellulosic components from the ligneous raw material can be oxidized to useful organic acids by the process of the present invention. Materials which are not recovered in the main line of the pulping-recovery process can be recycled through additional oxidation and recovery cycles and thus recovered. The used solvents are also recovered by normal commercial procedures so that there is substantially no solid waste resulting from the present process. The present process, therefore, avoids the stream pollution problems of other pulping processes.

Having generally described the invention, the following examples are given for purposes of illustration.

*Example 1*

One thousand parts by weight of spruce wood wafers were suspended in 16,000 parts by weight of water containing 500 parts by weight of sodium bicarbonate. This mixture was then cooked in a digester at a temperature of 140° C. for six hours at a total pressure of 200 pounds per square inch gauge. The partial pressure of the oxygen was 163 pounds per square inch absolute. A side stream of the cooking solution was circulated from the base of the digester to a perforated cone in the gas portion of the digester at a rate of 11,400 parts by weight of liquid per minute. The ratio of total interfacial area to solution volume was maintained at a value greater than one throughout the digestion period. The pressure above that of the steam produced by the temperature was maintained in the autoclave by the addition of gaseous oxygen. The gaseous oxygen atmosphere in the autoclave was blown every hour and replaced with fresh oxygen. This prevented the buildup of carbon dioxide and inert gases in the atmosphere above the solution. The pH of the solution at the end of the six hours was 9.0. The pulp produced by this digestion period amounted to 501 parts by weight and had essentially the following properties:

| | |
|---|---|
| Permanganate number | 14.23 |
| Brightness (G.E.) | 32.1 |
| Properties at 400 freeness (Valley beater)— | |
| Beating time _____minutes__ | 9 |
| Bulk _____cc./gm__ | 0.00144 |
| Burst factor | 60 |
| Tear factor | 54 |
| Breaking length _____meters__ | 9900 |
| Viscosity | 6.83 |

The permanganate number, which is a measure of the bleachability of the pulp, was determined in accordance with TAPPI standards. The other tests were also carried out in accordance with TAPPI standards. A General Electric reflectance meter was used to determine the brightness.

*Example 2*

Two hundred parts by weight of spruce wood wafers were suspended in 16,000 parts by weight of water containing 100 parts by weight of sodium bicarbonate. This mixture was cooked in the same manner as that of Example 1 for four hours at a temperature of 150° C. The oxygen partial pressure in the digester was maintained at 146 p.s.i. and the total gas pressure was 200 p.s.i. A side stream of the cooking solution was circulated through a perforated cone in the gas space of the digester at a rate of 11,400 parts by weight per minute. The ratio of total interfacial area to solution volume was maintained at a value greater than one throughout the digestion period. At the end of 4 hours cooking time, a yield of 51.4 percent of pulp was attained. The pH of the cooking liquor at the termination of the cook was 9.0. The pulp had the following properties:

| | |
|---|---|
| Permanganate number | 7.78 |
| Freeness (Canadian standard) | 680 |
| Bulk _____cc./gm__ | 0.00174 |
| Burst factor | 48.2 |
| Tear factor | 76 |
| Breaking length _____meters__ | 8200 |
| Viscosity | 8.3 |
| Brightness (G.E.) | 48.0 |

*Example 3*

One thousand parts by weight of spruce wood wafers were suspended in 16,000 parts by weight of water containing 500 parts by weight of sodium bicarbonate. This mixture was then cooked in the digester at a temperature of 130° C. for eight hours. A gaseous atmosphere containing oxygen at a partial pressure of 176 p.s.i. was maintained in the gas zone in the digester during the cooking time. The total gas pressure in the digester was 200 p.s.i. 11,350 parts by weight per minute of the cooking liquor was circulated as a side stream through the gas zone by means of a perforated cone. The ratio of total interfacial area to solution volume was maintained at a value greater than one throughout the digestion period. The oxygen atmosphere was replaced each hour with fresh oxygen. The pH of the cooking liquor at the termination of the cook was 9.2. This cook produced 61.5 percent pulp having essentially the following properties:

| | |
|---|---|
| Permanganate number | 24.72 |
| Brightness (G.E.) | 28.0 |
| Properties at 400 freeness (Valley beater)— | |
| Beating time _____minutes__ | 29 |
| Bulk _____cc./gm__ | 0.00134 |
| Burst factor | 68.0 |
| Tear factor | 49.5 |
| Breaking length _____meters__ | 10,800 |
| Viscosity | 5.09 |

*Example 4*

One thousand parts by weight of spruce wood wafers were suspended in 16,000 parts by weight of water containing 380 parts by weight of sodium bicarbonate. This mixture was then cooked in a digester at a temperature of 140° C. for six hours. The partial pressure of the oxygen in the gas zone of the digester was maintained at 163 p.s.i. during the cook. The total pressure in the digester was 200 p.s.i. The cooking liquid was circulated through a cone in the gas zone of the digester in the same manner at the rate of 11,350 parts per minute as in the preceding examples. The ratio of total interfacial area to solution volume was maintained at a value greater than one throughout the digestion period. The gaseous oxygen was replenished each hour during the cooking period. The pH value at the termination of the cook was 8.85. 603 parts by weight of pulp were produced having the following properties:

| | |
|---|---|
| Permanganate number | 18.09 |
| Brightness (G.E.) | 28.1 |
| Properties at 400 freeness (Valley beater)— | |
| Beating time _____minutes__ | 11 |
| Bulk _____cc./gm__ | 0.00150 |
| Burst factor | 70.5 |
| Tear factor | 50 |
| Breaking length _____meters__ | 9000 |
| Viscosity | 9.92 |

The waste liquor was evaporated from 16,000 parts by volume to 1000 parts. An aqueous 50 percent sulfuric acid was then added to the concentrate until a pH of about 2 was attained. The precipitate which formed as a result of the acidification was filtered and was found to be 54.0 parts by weight. The supernatant solution was then extracted with ether in a continuous extractor. 59.6 parts by weight of ether solubles were extracted. The ether extract was then distilled to a ratio of two parts distillate to one part residue. Formic and acetic acid were present in the distillate in the ratio of 30 parts by weight of acetic acid and 33.5 parts by weight of formic acid to 100 parts by weight of distillate. The residue was found to consist essentially of a mixture of furamic, succinic and pyromellitic acids. The raffinate from the ether extract was then extracted with butanol and the butanol extract (26.0 parts by weight)

in turn, distilled. Additional organic acids in the form of their butyl esters were obtained from this fraction.

*Example 5*

One thousand grams of spruce wafers were suspended in 16,000 cc. of water containing 500 grams of sodium bicarbonate. This mixture was then cooked in a cylindrical circulating autoclave of 52,000 cc. capacity at a temperature of 140° C. for six hours. The partial pressure of oxygen was 163 p.s.i. and the total pressure was 200 p.s.i. The resulting pulp weighed 626 grams and this pulp was refined in a Sprout-Waldron refiner at a plate clearance setting of .008 inch. The permanganate number of the resulting pulp was 24.62. The pH of the cooking liquor was 9.0 at the end of the cook. A side stream of digester solution was oxygenated by circulation through the dome of the autoclave. In this example the circulation was through a low angle (50°) spray nozzle set in the gas portion of the autoclave. The nozzle was a No. TF12N manufactured by the Bete Foz Nozzle, Inc., Greenfield, Massachusetts, having an orifice of 9/16" diameter and a capacity of 3.0 gallons per minute at 10 p.s.i. nozzle pressure or 4.6 g.p.m. at 20 p.s.i. The side stream was circulated at a rate of 10.2 liters per minute. The digester solution had a total volume of 0.595 cubic foot and the continuous interfacial area of the solution in the digester was .754 square foot. The ratio of continuous interfacial area in square feet to solution volume in cubic feet was therefore 1.27. The estimated instantaneous surface area of solution spray in the oxygen atmosphere was 2.42 square feet. This was based on an estimate of droplets of an average volume of 1/20 ml. in contact with the gaseous atmosphere for one second. The total interfacial area to solution volume ratio was therefore 5.34. The side stream spray thus increased the interfacial area to volume ratio by a factor of about 4.

In commercial operations using digesters of the type illustrated in Figure 13 or 14 of chapter 5 and having the dimensions of the digesters described in Table 14a of chapter 5 of Pulp & Paper Manufacture, ibid., for example a capacity of 2,500 cubic feet, a height of 35 feet and a diameter of 10 feet 6 inches, large scale commercial type vapor-liquid transfer apparatus are desirably used to oxygenate the cooking liquor. The mass transfer coefficient obtainable in such apparatus is larger than that obtainable in a spray so that the oxygen transferred from the atmosphere to the cooking liquor per unit area of interface is substantially greater than in the laboratory operation. Adequate oxygen transfer to carry out the process of the present invention in commercial scale digesters can, therefore, be obtained in appropriate apparatus when the total interfacial area to volume ratio is as low as one.

*Example 6*

One thousand parts by weight of poplar chips was suspended in 14,000 parts by weight of water containing 500 parts by weight of sodium bicarbonate and digested. The digestion period was six hours at 140° C. under an oxygen partial pressure of 163 p.s.i. A side stream of 11,350 parts by weight of the cooking liquor was circulated per minute through a wide angle (120°) spray in the gas portion of the digester. A 57.37 percent yield of pulp was obtained having a permanganate number of 9.58. The pH end point of the cooking liquor was 8.8.

It will be apparent from the foregoing examples that the process of the present invention is capable of producing a highly desirable pulp and simultaneously a spent cooking liquid from which ligneous by-products of considerable commercial value can be readily recovered. The pulp is obtained in good yield and yet its physical properties such as bulk, burst, tear and tensile strength, are comparable with the better pulps produced by other conventional methods. The characteristics of the pulp are similar to those of a Mitscherlich pulp. The pulp obtained by the present method, however, in contrast with Mitscherlich pulp, is produced with a short digestion period and because of the relatively low pressures involved can be produced on a scale comparable to the kraft and sulfite pulps. The spent liquor from the present pulping process is characteristically different from the spent liquors obtained in the sulfite and kraft processes. By-products such as organic acids are readily recovered from the current spent liquor leaving a clear liquor containing no oxidizable material. Furthermore, the liquor itself can be disposed of much more easily than other liquors because of its low viscosity, solids content and light color.

It is apparent that numerous modifications can be made without departing from the scope of the present invention.

What is claimed is:

1. In a process for the production of a fibrous pulp and organic acids from wood and the method which comprises treating wood fragments in an aqueous solution maintained at a pH of from about 7 to 9, at a temperature of from about 120° to 160° C. for from about 1 to 10 hours with a gaseous oxygen atmosphere containing oxygen under a partial pressure of about 40 to 250 pounds per square inch under conditions such that the ratio of oxygen atmosphere-solution total interfacial area in square feet to solution volume in cubic feet is at least one and recovering the resultant pulp and organic acids.

2. In a process for the simultaneous production of a fibrous pulp and organic acids from wood the method which comprises treating wood fragments contained in an aqueous solution maintained at a pH of from about 7 to 9, at a temperature of from about 120° to 160° C. for from about 1 to 10 hours under a gaseous oxygen atmosphere having a partial oxygen pressure of about 40 to 250 pounds per square inch, while treating at least a portion of said solution with gaseous oxygen under conditions such that the ratio of total oxygen atmosphere-solution interfacial area in square feet to solution volume in cubic feet is at least one, and recovering the resultant pulp and organic acids.

3. In a process for the simultaneous production of a fibrous pulp and organic acids from wood the method which comprises treating wood chips contained in an aqueous solution maintained at a pH of from about 7 to 9, at a temperature of from about 120° to 160° C. for from about 1 to 10 hours under a gaseous oxygen atmosphere having a partial oxygen pressure of about 40 to 250 pounds per square inch, while continuously passing oxygen gas in finely dispersed form through the solution such that the ratio of oxygen atmosphere-solution total interfacial area in square feet to solution volume in cubic feet is greater than about one and recovering the resultant pulp and organic acids.

4. In a process for the simultaneous production of a fibrous pulp and organic acids from wood the method which comprises treating wood chips contained in an aqueous solution maintained at a pH of from about 7–9, at a temperature of from about 120° to 160° C. for from about 1 to 10 hours under a gaseous oxygen atmosphere having a partial oxygen pressure of about 40 to 250 pounds per square inch, while treating a side stream of said solution with gaseous oxygen under conditions such that the ratio of oxygen atmosphere-solution total interfacial area in square feet to solution volume in cubic feet is greater than about one, and recovering the resultant pulp and organic acids.

5. The process of claim 2 wherein the pH is maintained between about 7 and 9 by a sodium bicarbonate buffer.

6. The process of claim 2 wherein the pH is maintained between about 7 and 9 by the controlled addition to the solution of sodium hydroxide throughout the pulping operation.

7. In a process for the simultaneous production of a fibrous pulp and organic acids from wood the method which comprises treating wood chips contained in an aqueous bicarbonate solution maintained at a pH of from about 7 to 9, at a temperature of from about 130° to 150° C. for from about 3 to 8 hours under a gaseous oxygen atmosphere having a partial oxygen pressure of about 165 pounds per square inch, while treating a side stream of said solution with gaseous oxygen under conditions such that the ratio of oxygen atmosphere-solution total interfacial area in square feet to solution volume in cubic feet is greater than about one, and recovering the resultant pulp and organic acids.

References Cited in the file of this patent

UNITED STATES PATENTS

| | | |
|---|---|---|
| 2,673,148 | Harris | Mar. 23, 1954 |
| 2,686,120 | Marshall et al. | Aug. 10, 1954 |

FOREIGN PATENTS

| | | |
|---|---|---|
| 354,599 | France | July 31, 1905 |
| 185,421 | Great Britain | Aug. 31, 1922 |